United States Patent Office 3,520,008
Patented July 14, 1970

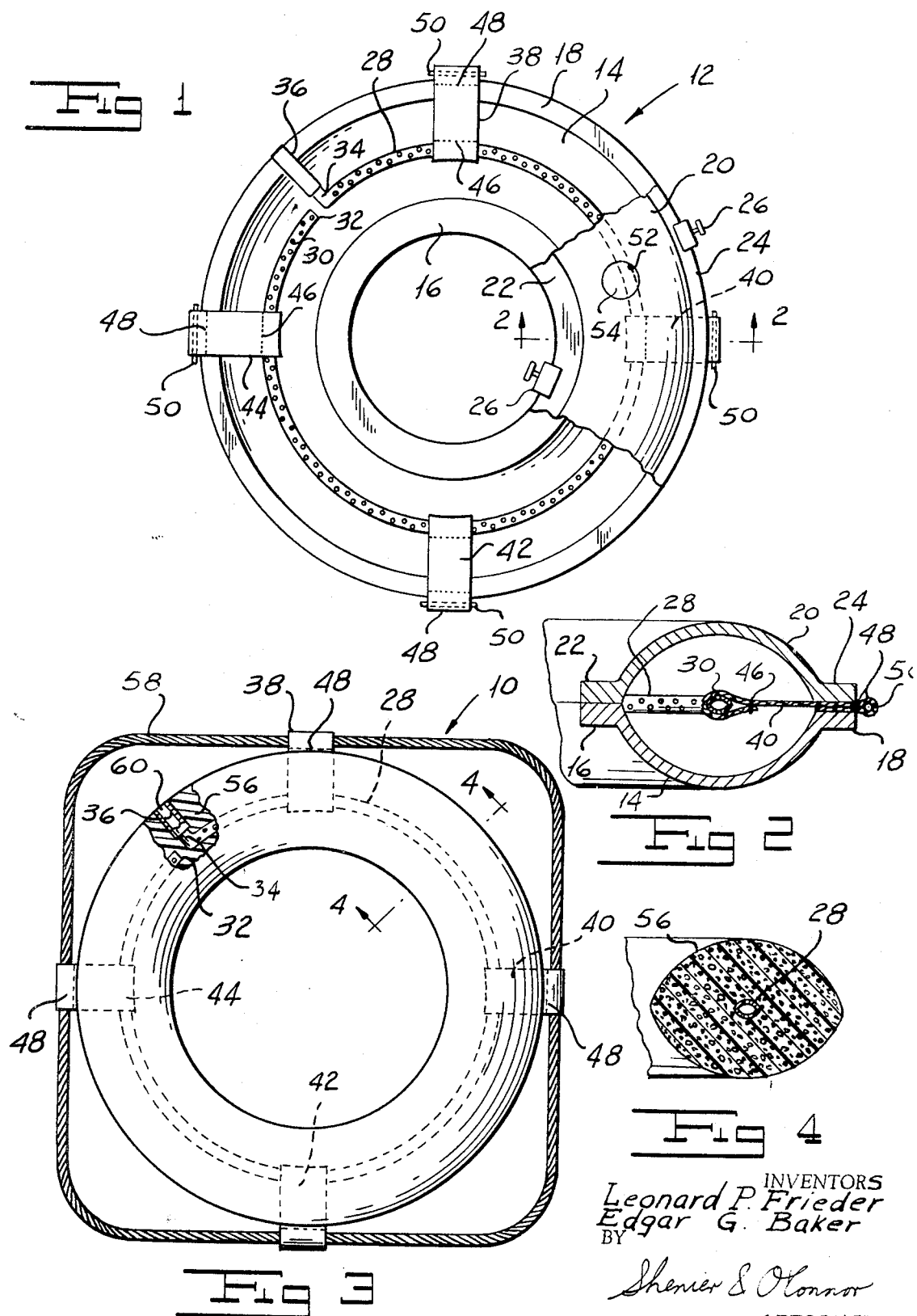

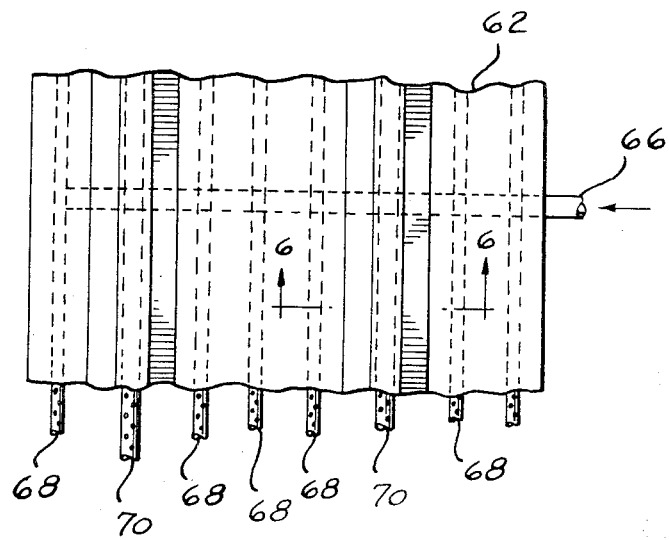
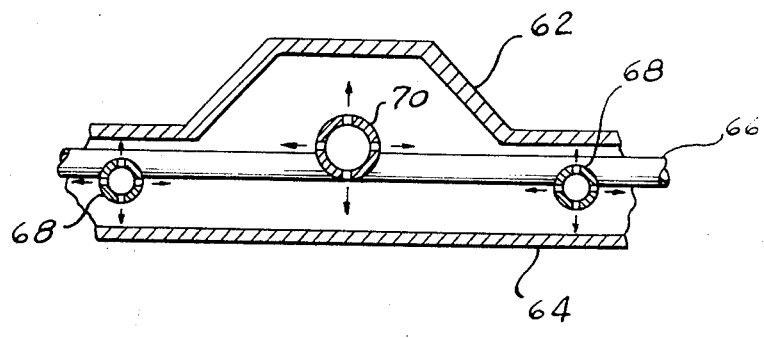

3,520,008
REINFORCED EXPANDED SYNTHETIC RESIN ARTICLE
Leonard P. Frieder, Clarks Green, and Edgar G. Baker, Carbondale, Pa., assignors to Gentex Corporation, New York, N.Y., a corporation of Delaware
Filed June 13, 1966, Ser. No. 557,052
Int. Cl. B63c *9/10*
U.S. Cl. 9—14                                6 Claims

ABSTRACT OF THE DISCLOSURE

In general our invention contemplates the provision of a method of making a reinforced expanded plastic article in which we first place in the open mold a heating agent distributor formed of material which is stronger than the finished expanded plastic and which is so shaped as effectively to convey and distribute the heating medium, such as steam, throughout the mold. When the distributor has been placed in the mold, the mold is closed and filled with the beads of resinous material. When the heating medium is supplied to the distributor, it causes all of the beads to expand to form the completed article. When the article has been formed, the distributor remains therein as a reinforcing element to provide an article which is stronger than is the expanded plastic material per se.

BACKGROUND OF THE INVENTION

Expanded plastic articles are widely used to form a wide variety of articles. The outstanding advantage of this material is its low cost. In forming an article in the prior art, a charge of beads of a material such, for example, as polystyrene, impregnated with a blowing agent is placed in a mold and heat is applied to cause the beads to expand to form the finished article. The most widely used method of applying heat to the beads in the prior art in order to expand the beads is the application of steam to the mold. For example, the mold may be perforated and following the insertion of a charge of the resin beads, the entire mold is placed in a steam chest in which it remains for a period of time sufficient to expand the beads to the degree required to form the article. The material may be expanded up to about thirty times its original volume. The finished article is lightweight, is buoyant and has good thermal insulating properties.

It will readily be appreciated that the method of forming expanded synthetic resin articles in the prior art requires a long time for the steam to penetrate through the mold to heat the beads to the degree required. It is, therefore, expensive. Moreover, the molds themselves are expensive and the method requires the use of a steam chest holding from 80 to 100 pounds of steam for each mold half. While in some applications the lightweight characteristic of the finished article is of advantage, in other applications it would be desirable to have a somewhat heavier article. Further, the finished article is weak in the sense that it breaks with relative ease. With the use of methods of the prior art for forming expanded synthetic resin articles, the size of the article is severely limited.

DESCRIPTION OF THE INVENTION

We have invented a method of making a reinforced expanded synthetic resin article which is simpler, less expensive and more expeditious than are methods of the prior art. Our article is stronger than are expanded synthetic resin articles of the prior art. We may selectively increase the weight of the finished article.

One object of our invention is to provide an expanded synthetic resin article which is stronger than are expanded plastic articles of the prior art.

Another object of our invention is to provide a method of making a reinforced expanded synthetic resin article which is simpler and less expensive than are methods of the prior art.

A further object of our invention is to provide a method of making an expanded synthetic resin article which is stronger than are articles of the prior art.

A still further object of our invention is to provide a method of making a reinforced expanded synthetic resin article which is faster than are methods of the prior art.

Other and further objects of our invention will appear from the following description.

In the accompanying drawings which form part of the instant specification and which are to be read in conjunction therewith and in which like reference numerals are used to indicate like parts in the various views:

FIG. 1 is a top plan view of a mold and a reinforcing, steam introducing member which we employ in the practice of our method of making reinforced expanded synthetic resin articles with parts broken away.

FIG. 2 is a fragmentary sectional view of the mold shown in FIG. 1 taken along the line 2—2 of FIG. 1 and drawn on an enlarged scale.

FIG. 3 is a plan view of one type of reinforced expanded plastic article made by our method, with parts broken away.

FIG. 4 is a fragmentary sectional view of the article shown in FIG. 3 taken along the line 4—4 of FIG. 3 and drawn on an enlarged scale.

FIG. 5 is a fragmentary plan view illustrating the mold employed in our method of making another form of reinforced expanded synthetic resin article.

FIG. 6 is a fragmentary sectional view of the mold structure shown in FIG. 5 taken along the line 6—6 of FIG. 5 and drawn on an enlarged scale.

Referring now to FIGS. 1 to 4, we have shown the steps in practice of our method for making an article such, for example, as a reinforced, expanded-synthetic-resin, buoyant life ring indicated generally by the reference character 10. In order to form the ring 10 we provide a mold indicated generally by the reference character 12 comprising a lower mold half 14 having a suitable annular cavity conforming to the lower half of the life ring 10. The lower mold half 14 includes an inner peripheral flange 16 and an outer peripheral flange 18. An upper mold half 20 provided with a cavity corresponding to the upper half of the life ring 10 has an inner peripheral flange 22 adapted to cooperate with flange 16 and an outer peripheral flange 24 adapted to cooperate with the flange 18. Each of the mold halves may be made of any suitable material. For example, brass, bronze, aluminum and steel all are satisfactory materials. The wall thickness of the mold customarily is at least ¼ inch since internal pressure up to 50 p.s.i. may be developed during expansion of the plastic material. We employ any suitable means such, for example, as clamps 26 for securing the mold halves in assembled relationship.

In practice of our method of forming a reinforced expanded plastic article, we position a reinforcing member within the mold before the mold cavity is filled with the synthetic resin beads which are to be expanded. More specifically, in making an article such as the life ring 10, we place a tubular element 28 of annular shape within the mold. We provide the annular portion of the element 28 with a plurality of perforations 30 through which steam passes into the material within the mold in a manner to be described. The element 28 may be made of any appropriate material which has a structural strength which is greater than that of the expanded plastic material so as to reinforce the same. By way of example, it might be aluminum, steel, brass or even a suitable tubular synthetic resin. If it is formed of synthetic resin, it should not be a material which fuses at the temperature at which the expansion of the plastic material takes place but should retain its structural integrity during the expanding operation.

Preferably we close one end 32 of the tube and bend the other one radially outwardly to form the neck 34 which receives a short length 36 of a suitable resilient material to permit the introduction of steam into the member 28. We prefer to provide the short tube 36 for the introduction of steam to avoid the undesirable result of an exposed metallic piece in the finished article.

In the manufacture of an article such as a life ring, we take advantage of elements which are present in the finished structure properly to position the member 28 within the mold. We secure four respective lengths 38, 40, 42 and 44 of material such as a fabric webbing or the like around the tube 28, preferably at equally spaced positions therealong. Any suitable means such, for example, as stitching 46 may be used to achieve this result. Stitching 48 in each of the lengths at the end remote the element 28 forms a loop in the length, which loop performs a function in the finished article as will more fully be described hereinafter.

Having secured the lengths 38, 40, 42 and 44 to the element 28, we place the element in the open bottom part 14 of the mold. When that has been accomplished, the upper mold half 20 is assembled on the lower half 14. In the course of this operation, we position pins 50 in the loops of the fabric lengths. As the mold sections are moved together and clamped by means, such as clamps 26, the engagement of the loops formed by stitching 48, which loops receive the pins 50 with the outer edges of the flanges 18 and 24, serves automatically to position the element 28 centrally of the mold cavity.

After the mold has been closed with the element 28 properly positioned therein and with the tube 36 accessible from outside the closed mold, the synthetic resin beads such, for example, as polystyrene beads, can be introduced into the mold as by blowing them in through a suitable opening 52, which opening may be closed by a plug 54 or the like after the mold has been filled. It may be preferable to pre-expand the solid beads to about 20 to 30 times their original size by the application of heat before they are introduced into the closed mold. When the pre-expanded beads 56 have filled the mold, plug 54 is replaced and a suitable source (not shown) of steam is connected to the inlet tube 36 to feed steam to the distributor element 28. The element 28 which is centrally positioned within the mold cavity distributes steam throughout the mold cavity fully to expand the beads to complete the body of the article.

The time required for the expanding operation to take place depends in some degree on the size of the article being produced. For a relatively small body, the time would be measured in seconds and for a relatively larger body, in a number of minutes. Cooling time is somewhat longer than the time required fully to expand the beads 56. This again would depend upon the size of the article being produced. We have discovered that our internal application and distribution of the heating medium appreciably reduces the heating time as compared with heating times of the prior art.

After the material in the mold has completely expanded and has been permitted to cool, the mold is opened and the body is removed. The pins 50 are taken out of the loops formed by stitching 48 and a braided line 58 is passed through the loops formed by stitching 48 and has its ends secured to each other in any suitable manner. An advantage of this construction is that any force exerted on the line 58 is transmitted directly to the reinforcing element 28 rather than being applied directly to the relatively weaker material 56.

We employ any suitable element such, for example, as a water impervious plug 60 to form a watertight seal to close the opening in the body formed by the tube 36.

After the body has been formed it may be painted or dyed any desired color. Care should be taken of course that the solvent used in the paint or dye is not one which attacks the material such as expanded polystyrene. Where the material is polystyrene, in general the paint should be based on film formers which are dispersed or soluble in aliphatic hydrocarbons, alcohol or water. We have found that a suitable density of the finished body is about five pounds per cubic foot.

As has been pointed out hereinabove, the expanded synthetic resin material per se is relatively light. Owing to that fact, in use to form a body such as a life ring, the resultant article is so light that it cannot properly be thrown. If we desire to improve that feature of the body, we may increase the weight of the distributor 28 so as to increase the weight of the finished article.

Referring now to FIGS. 5 and 6, we have shown the application of our method in forming a relatively larger body than the ring 10. For example, it might be a plank-like object, the thickness of which varies in cross section. To form this device, we use upper and lower mold members 62 and 64 providing cavities conforming to the exterior surface shape of the finished body. In that form of our method, we use a distributor having a tree-like configuration. For example, it may include an unperforated hollow supply tube 66 to which we connect a plurality of distributing pipes 68 and 70 extending longitudinally of the body. Preferably the arrangement is such that the distributing pipes 68 are located in relatively thinner portions of the finished body and the relatively larger distributing pipes 70 are located in the thicker body portions such as might form ribs, for example, in the finished article. With the pipe 66 and the distributing pipes 68 and 70 in position and with the upper and lower mold sections 62 and 64 closed, the pre-expanded beads are introduced into the mold cavity and steam is supplied to pipe 66 in the manner described in connection with FIGS. 1 to 4. It is to be noted that in an article of the type which would be formed as described in connection with FIGS. 5 and 6, the distributor system which remains in the article after formation not only reinforces the article but also provides passages through the article for the reception of electrical wiring, plumbing and the like. This feature would be of utility where we form wall sections for use in construction.

In practice of our method of forming reinforced expanded synthetic resin articles, we first position the combined medium distributor and reinforcing element 28 in the mold. The mold is closed and pre-expanded beads of a suitable synthetic resin such, for example, as polystyrene beads impregnated with a blowing agent are inserted in the closed mold by blowing them in or the like. When the mold has been filled with beads, steam is supplied to the distributor 28 for a period of time sufficient fully to expand the beads to form the body of the finished article. When that has been done, the body is permitted to cool and then is removed from the mold for any subsequent operations which may be required.

In use of the form of our article shown in FIG. 3, the connection between line 58 and element 28 provided by the lengths of webbing 38, 40, 42 and 44 causes forces applied to the line to be transmitted directly to the relatively stronger reinforcing element 28 rather than to the weaker material of the body. In use of an article formed in accordance with FIGS. 5 and 6, the pipes 68 and 70 not only reinforce the member but also provide passages for electrical wiring or plumbing or the like.

It will be seen that we have accomplished the objects of our invention. We have provided a method of making a reinforced expanded synthetic resin article which is simpler and more expeditious than are methods of the prior art. The article formed by our method is stronger than is an article consisting entirely of expanded synthetic resin, while retaining the advantages of articles of this material. Our method permits formation of inexpensive, relatively strong buoyant articles of expanded synthetic resin.

It will be understood that certain features and subcombinations are of utility and may be employed without reference to other features and subcombinations. This is contemplated by and is within the scope of our claims. It is further obvious that various changes may be made in details without departing from the spirit of our invention. It is, therefore, to be understood that our invention is not to be limited to the specific details shown and described.

Having thus described our invention, what we claim is:

1. A reinforced article of expanded synthetic resin including a body of said expanded synthetic resin having an outer surface, a hollow fluid distributing reinforcing element embedded in said body, said element being formed of a material having a greater tensile strength than said resin of said body, means forming a passage from the interior of said element to said outside surface, and means for sealing said passage against the entry of fluid.

2. A reinforced article as in claim 1 in which said element is generally centrally located within said body.

3. A reinforced article as in claim 1 in which said resin is polystyrene and in which said reinforcing element is a metal tube.

4. An article as in claim 1 including a length of material extending from said element to a location outside said body and a flexible member carried by said material outside said body.

5. An article as in claim 1 including a plurality of lengths of material secured to said element at spaced locations therealong, each of said lengths extending to a position outside said body and a flexible member carried by said lengths outside said body.

6. An article as in claim 1 in which said reinforcing element has a perforated wall.

References Cited

UNITED STATES PATENTS 2,802,222   8/1957   Chapman _____ 9—17

FOREIGN PATENTS 15,303    7/1909   Great Britain.
97,442    1/1961   Norway.
153,922   3/1956   Sweden.

MILTON BUCHLER, Primary Examiner

J. L. FORMAN, Assistant Examiner

U.S. Cl. X.R.

9—340